(12) United States Patent
Eiermann

(10) Patent No.: US 6,959,961 B2
(45) Date of Patent: Nov. 1, 2005

(54) LOUVER VEHICLE ROOF

(75) Inventor: Michael Eiermann, Pfungstadt (DE)

(73) Assignee: ArvinMeritor GmbH, Dietzenbach (DE)

( * ) Notice: Subject to any disclaimer, the term of this patent is extended or adjusted under 35 U.S.C. 154(b) by 22 days.

(21) Appl. No.: 10/794,906

(22) Filed: Mar. 5, 2004

(65) Prior Publication Data
US 2004/0189058 A1 Sep. 30, 2004

(30) Foreign Application Priority Data
Mar. 7, 2003 (EP) .............................. 03005077

(51) Int. Cl.$^7$ .............................................. B60J 7/047
(52) U.S. Cl. ................................................ 296/220.01
(58) Field of Search .................... 296/220.01

(56) References Cited

U.S. PATENT DOCUMENTS

| 6,296,302 B1 | 10/2001 | Martinus Lenkens |
| 6,502,898 B1 | 1/2003 | Salz |
| 2004/0075303 A1 * | 4/2004 | Salz .......................... 296/210 |
| 2004/0090091 A1 * | 5/2004 | Salz ...................... 296/220.01 |

FOREIGN PATENT DOCUMENTS

| DE | 43 29 580 | 11/1994 |
| DE | 197 20 822 C1 | 3/1999 |
| DE | 198 56 873 C1 | 2/2000 |
| EP | 03 00 5077 | 7/2003 |
| WO | WO 00/48857 | 8/2000 |

* cited by examiner

Primary Examiner—Dennis H. Pedder
(74) Attorney, Agent, or Firm—Carlson, Gaskey & Olds

(57) ABSTRACT

A louver vehicle roof has several sliding and tilting louvers (1 to 4) provided for optional closure or at least partial exposure of a roof opening (6). The louvers lie next to each other in the closed position and form a flat assembly. The louvers are supported and interlinked kinematically so that on exposure and closure of the roof opening (6) louver after louver is moved. The louvers (1 to 4) are linked with few, simple components identical from one louver to the next. Louver guide blocks (15) are temporarily coupled together during the closing process by stop/stop surface pairs (29). During an opening process louver after louver is moved progressively and tilted up, where the louvers not yet in movement are held stationary by locking projections/locking elements (31, 32).

20 Claims, 9 Drawing Sheets

LOUVER VEHICLE ROOF

BACKGROUND OF THE INVENTION

The invention relates to a louver vehicle roof with several sliding and tilting louvers provided for optional closure or at least partial exposure of a roof opening. In a closed position the louvers lie next to each other and form a flat assembly. The louvers are interlinked kinematically so that on exposure and closure of the roof opening, the louvers are moved in turn.

Louver roofs are already proposed in various embodiments. In a known vehicle roof with louvers shown in DE 43 29 580 D1, the individual louvers are coupled together by link arrangements controlling the tilt movements of the louvers. The mechanical components used for guidance, control and coupling of the louvers are costly and require multiple pieces. The link arrangements can cause considerable friction losses in the louver drive system. Also a stable, rattle-free state of the louvers during driving cannot be guaranteed. In addition, the arrangement is such that the rearmost louver viewed in the forward travel direction of the vehicle tilts up first and tilts down last into its joined position, which is not always desirable.

In an adjustment device for another known multispoiler or louver roof shown in WO 00/48857, the movement sequence of the individual louvers is such that viewed in the forward travel direction of the vehicle, the front louver is tilted up first and tilted down last into its joined position. This device includes the drawbacks that it works with control links and requires an additional drive carriage.

SUMMARY OF THE INVENTION

The invention provides a louver vehicle roof of comparatively simple design and hence more reliable function in which the louvers are moved by few control elements identical from one louver to the next and in which the tilted up louvers have a secure, vibration-free condition during driving.

One example louver vehicle roof has several sliding and tilting louvers provided for optional closure or at least partial exposure of a roof opening. In a closed position, the louvers lie next to each other and form a flat assembly. The louvers are interlinked kinematically so that on exposure and closure of the roof opening, one louver is moved after another.

Each louver has two sides firmly connected with a louver carrier that is swivellably linked on a guide block. A guide rail is fixed to the roof and common to all guide blocks on the same side of the louvers. The rail guides movement of the blocks.

Each louver carrier is linked to a first end of a hinge rod. The second end of each rod is linked to the adjacent guide block.

The link points of the louver carriers at two adjacent guide blocks, together with the link point of the first end of the associated hinge rod, form a hinge triangle in which the link point of the first end of the associated hinge rod lies above the two link points on the adjacent guide block. This orientation exists even at the maximum spacing of the two adjacent guide blocks in the closed position of the two associated adjacent louvers.

Each louver carrier includes a stop and each guide block includes a stop surface. The guide blocks move interlinked via the stop/stop surface pairs.

The example hinge rods have locking projections attached to them. In the closed position of the louvers, each locking projection engages with a locking element on the guide rail so that under pressure on the first guide block, only the first guide block can be moved until the corresponding louver tilts up and the first locking projection is released from its locking element. Under continued pressure on the first guide block, the next guide block can be moved, its louver tilting up, until the second locking projection is released from its locking element, etc. One louver after another tilts up accordingly into the open position as long as the pressure on the first guide block is maintained.

One example louver vehicle roof has no guide or control linkage. Each louver has only three function elements which are the same for all louvers. A louver carrier, a guide block and a hinge rod are all that is required in one example. These few, simply designed components are connected together and with the adjacent function elements via swivel hinge points which ensure smooth movement and rattle-free operation. The interposition of a hinge rod in each case between a louver carrier and the adjacent guide block results in a very stable three-point support for each louver via a hinge triangle.

In one example, the temporary close interlinking of the guide blocks necessary for the closing process is achieved by simple stop/stop surface pairs which disengage in succession on closure of the louvers until the guide blocks remain connected together only via the link rods and louver carriers. For the opening process, which also takes place progressively from one louver to the next, simple means are provided which hold the louvers that are not yet in the opening movement in their closed position. The locking projections attach to the hinge rods and the locking elements provided on the guide rails for the guide blocks at the associated points. In the closing process the locking projections successively engage with the associated locking elements. During the opening process, the locking projections successively release from the associated locking elements.

One example arrangement of link points for the hinge rods and the louver carriers on the guide blocks is where the swivel bearings for the louver carriers are arranged compactly in the vicinity of the base wall of the guide rails. This facilitates a desired low installation height of the louver vehicle roof. One embodiment of the hinge rods allows the louvers to be pushed closely together to expose a large part of the available roof opening.

The stops are arranged on the louver carriers in one example with the allocated stop surfaces arranged on the guide blocks. The stop surfaces can each be a part of a slot molded into the guide blocks and able to hold the associated stop displaceably with movement play. To facilitate insertion of the stops into the slots, the slots can be fitted with chamfers at the inlet and outlet end for the stops.

In one example, the cooperating locking elements can easily be provided as correspondingly arranged recesses in the guide rails to hold the projections.

The link points for the second end of the rear hinge rod can be provided on a bearing block attached to the guide rails. If this is attached to the guide rail so that it can be adjusted or moved forwards, the rear louver can be tilted up into the ventilation position, the other louvers remaining in the closed position.

The invention is now described in more detail below with reference to a preferred example embodiment of a louver vehicle roof shown schematically in the drawings. The drawings can be briefly described as follows.

DETAILED DESCRIPTION OF THE PREFERRED EMBODIMENT

Figure 1:
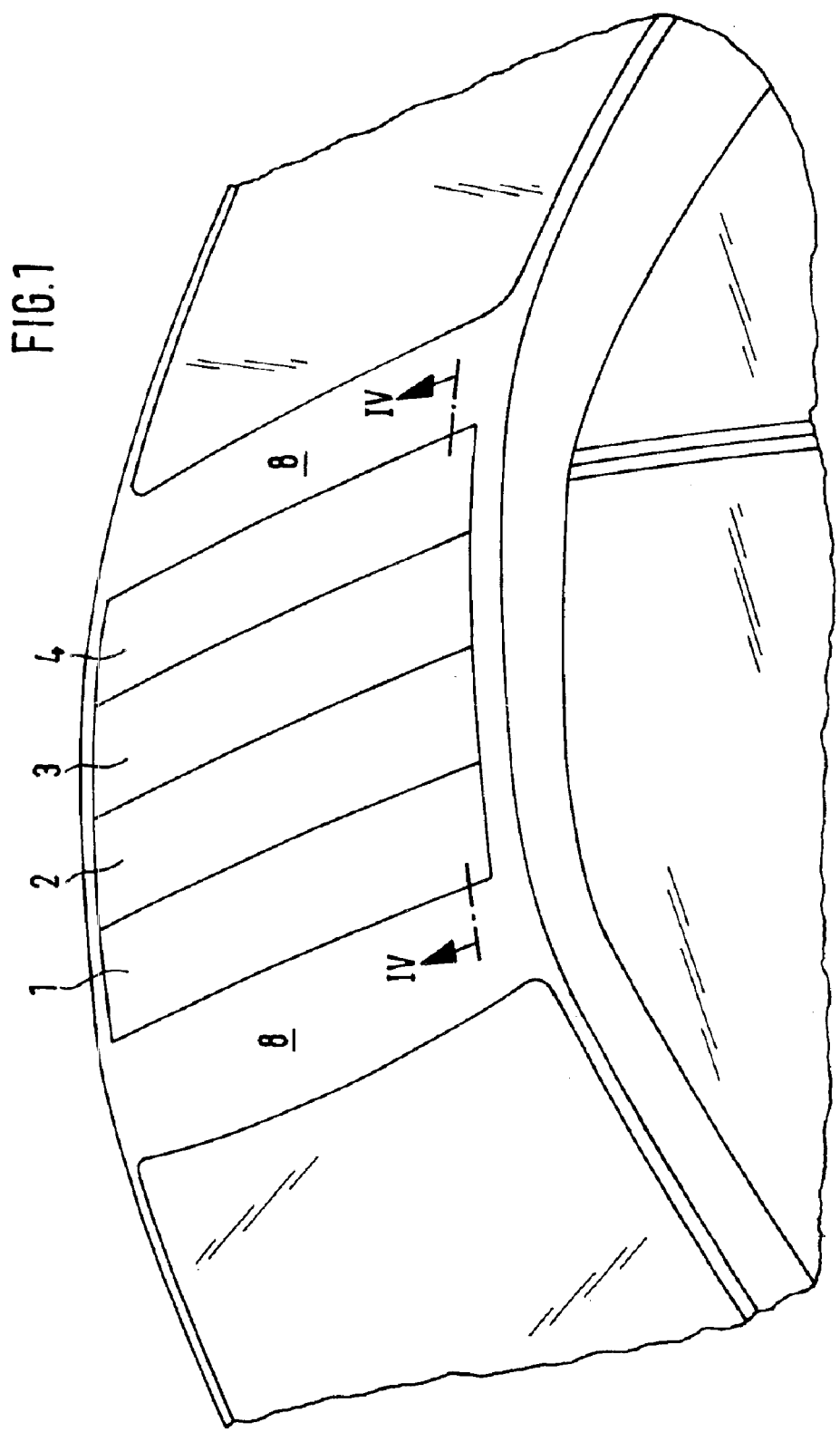
FIG. 1 is a perspective view of a vehicle roof with four louvers in the closed position.
Figure 2:
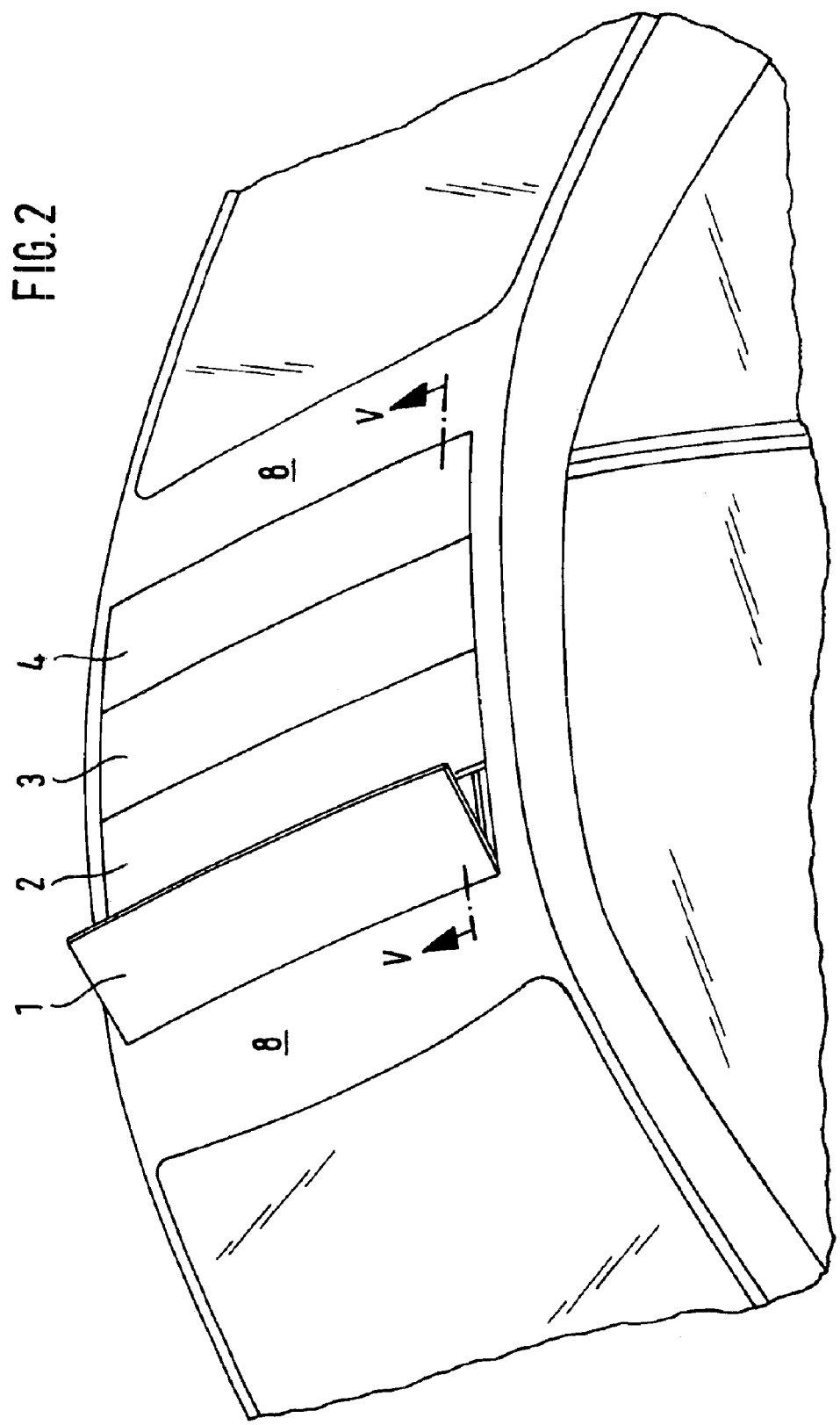
FIG. 2 shows the vehicle roof according to FIG. 1, but with the front louver tilted up.
Figure 3:
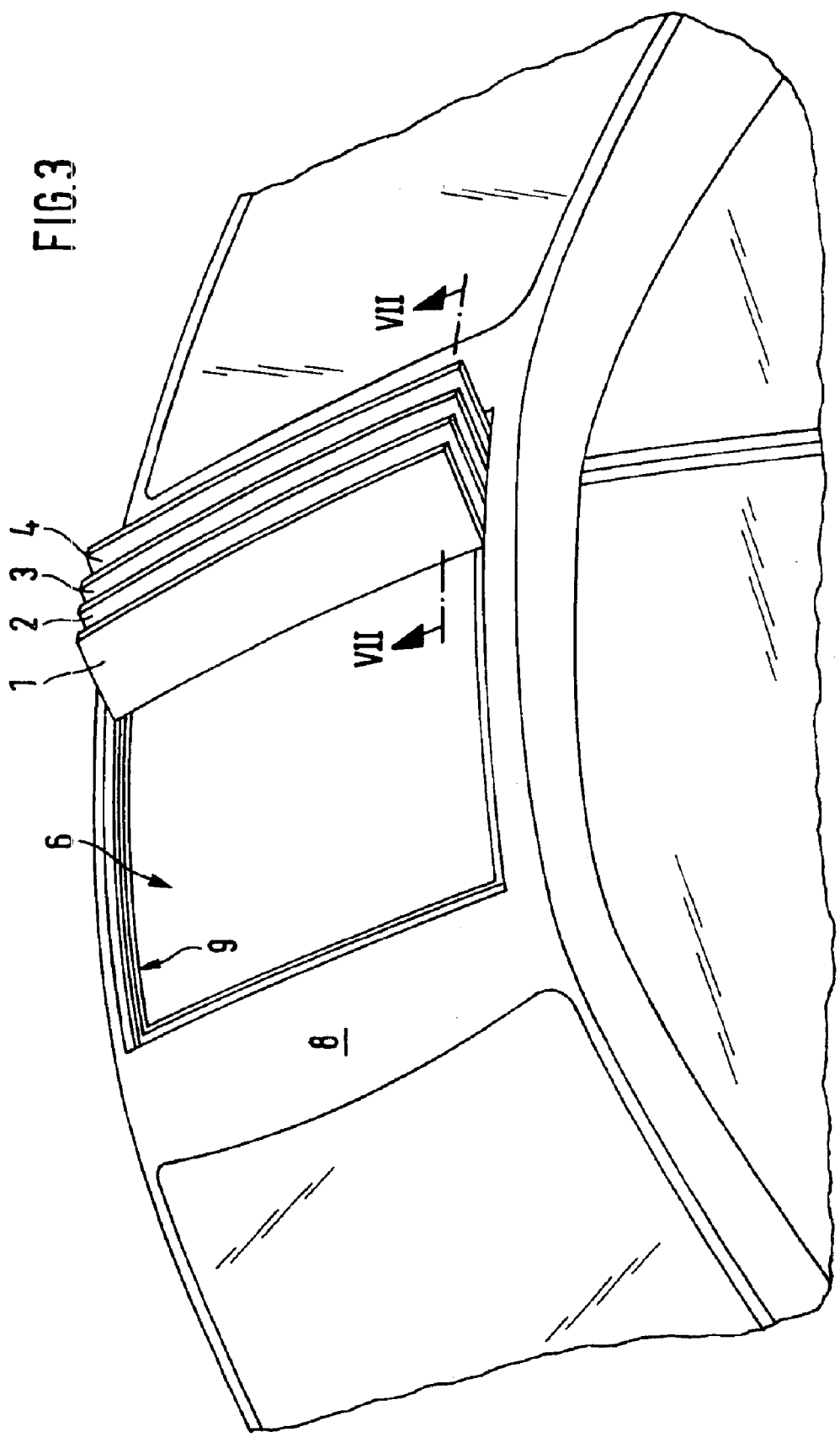
FIG. 3 shows the vehicle roof according to FIGS. 1 and 2, but with all four louvers tilted up and moved as far back as possible.
Figure 4:
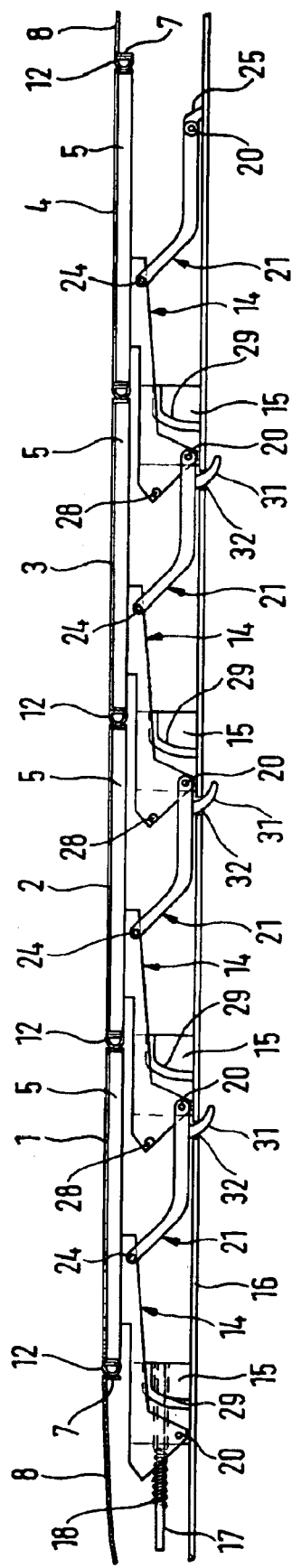
FIG. 4 is a cross-section through the closed vehicle roof corresponding to the cut line IV—IV in FIG. 1.

In the example embodiment of FIG. 1, the vehicle roof is shown with four louvers 1, 2, 3 and 4, but the number of louvers can be greater or fewer. Louvers 1 to 4 are of the same size and have a rectangular contour in this example. They can be made from a suitable plastic, glass or metal plate. As the cross-section views show, in the example embodiment, the louvers are formed from steel or aluminum plates edged all round and on the inside fitted with a foam lining 5, for example comprising a plastic. In the closed position the four louvers 1 to 4 next to each other form a flat assembly as shown in FIGS. 1 and 4. The assembly selectively closes the roof opening 6 which is exposed to the maximum in FIG. 3. The roof opening 6 is surrounded and defined by folded edges 7 of the fixed roof panel 8.

A roof frame 9 shown in FIG. 9 lies below the louvers 1 to 4 and within the roof opening 6. Its inner surface 10 borders the free area within the roof opening 6 perceptible from the vehicle interior. In the example shown, the roof frame 9 is connected with the vehicle body by threaded members 11.

The louvers 1 to 4 in the closed position are sealed against each other and against the front and rear edges 7 of the roof panel 8 by sealing profiles 12 as shown (e.g., in FIG. 4). The sealing profiles 12 are attached for example to the front edges of the louvers 1 to 4 and to the rear edge 7 of the roof panel 8. The side seal between the louvers 1 to 4 and the vehicle body is ensured by sealing profiles 13 attached to the roof frame 9 as shown in FIG. 9.

Louvers 1 to 4 are interlinked kinematically as described below to provoke their slide and tilt movements. The terms "front" and "rear" used here in relation to the vehicle roof and its components always relate to the forward travel direction of the vehicle, are for discussion of the illustrated embodiment only and should not be construed in a limiting way.

Referring to FIGS. 4–8, each of the louvers 1 to 4 is firmly connected at its two short (i.e., lateral) sides with a louver carrier 14. Each louver is attached to two louver carriers 14. In the drawings only the one side of the louvers is shown and described accordingly. The other side is formed as a mirror image. Each louver carrier 14 is hinged on a guide block 15 which is guided moveably along a guide rail 16 fixed to the roof and common to all guide blocks 15 on the same side of the louvers 1 to 4.

Figure 9:
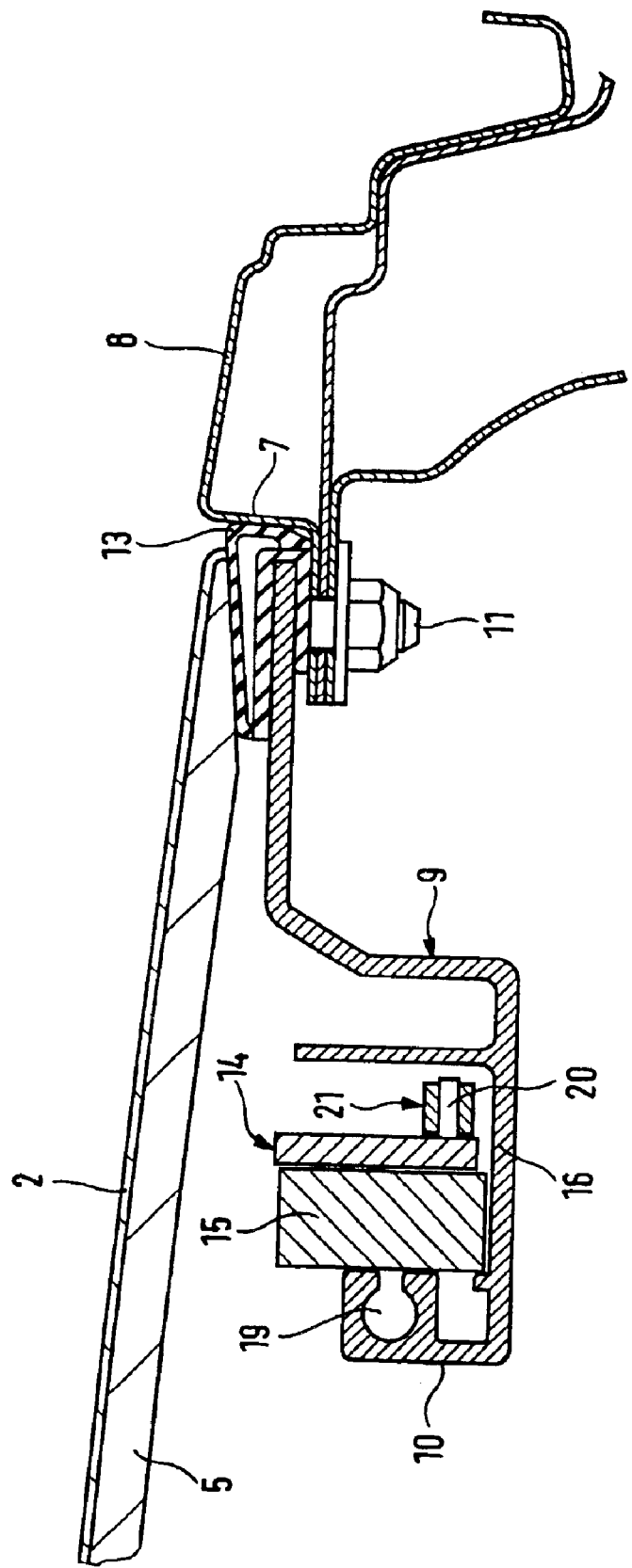
FIG. 9 is a broken away cross-section through the vehicle roof and a closed louver corresponding to the cut line IX—IX in FIG. 6.

As shown in FIG. 9, the guide rails 16 are for example part of the roof frame 9. Acting on the front guide rail 15 is a flexible control cable 17 which is fitted with a helical threaded winding 18 and is guided moveably and compression-resistant in a guide channel 19. The control cable exerts a tension or pressure on the front guide block 15. To this end a control cable on both louver sides is guided via a manually driven or motorized toothed pinion (not shown) which engages in the manner of a toothed rod drive with the threaded windings 18 of the control cable 17 and causes parallel slide movements of the control cable 17 on both louver sides in one or the other direction, depending on whether a tension or a pressure is exerted on the two front guide blocks 15. The cable drive system is commonly used in vehicle sliding roofs or similar and therefore requires no further description.

The link points 20 at which the louver carriers 14 are hinged to the guide blocks 15 are formed by the arrangement of swivel pins/bores on the corresponding components and allow tilting of the louver carriers 14 in vertical swivel planes. As is clear for example from FIG. 6, the link points 20 of the louver carriers 14 on the guide blocks are provided in each case at the front in the lower part of the guide blocks 15 and lie in the same horizontal height plane for all guide blocks 15.

A hinge rod 21 has a first end 22 linked to each louver carrier 14. A second end 23 of each rod 21 is linked to the link point 20 of the adjacent louver carrier 14, which is coupled to an associated guide block 15. The first end 22 is linked via a link point 24, also comprising a swivel pin/bore arrangement similar to link point 20, and allows relative swivel movements between the louver carrier 14 and the hinge rod 21 in a vertical plane (i.e., the swivel pins on link points 20 and 24 have parallel axes).

Figure 5:
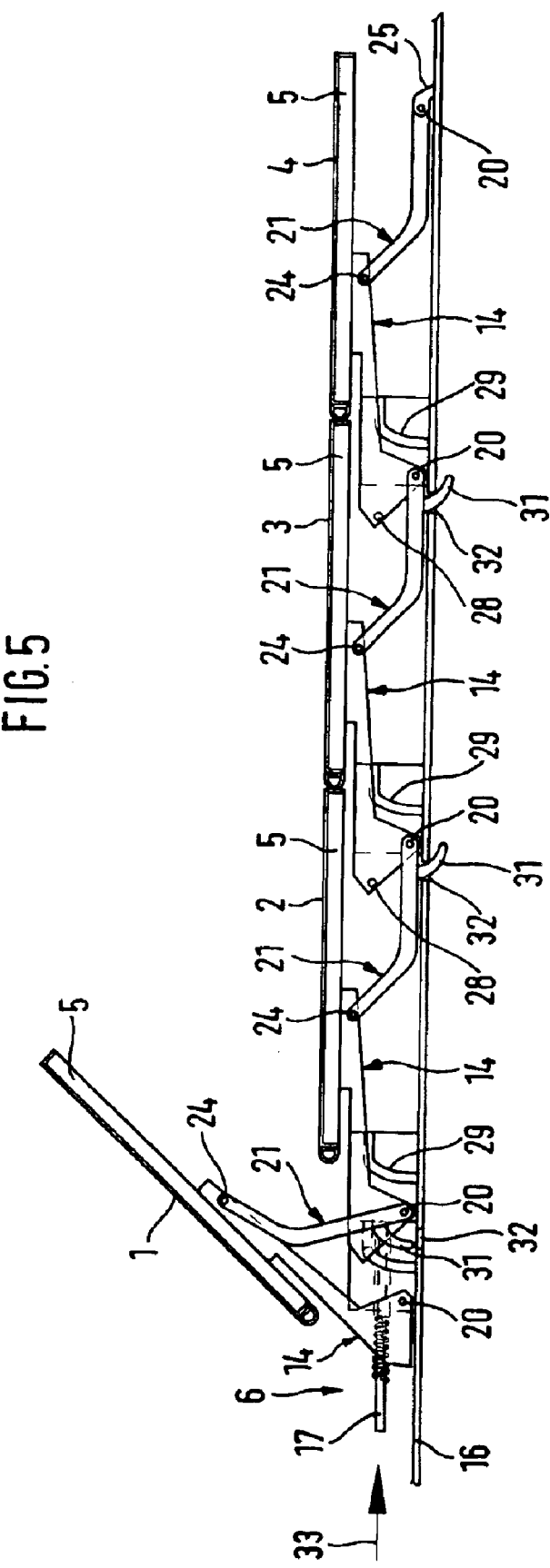
FIG. 5 is a cross-section through the vehicle roof with the front louver tilted up according to the cut line V—V in FIG. 2, shown without adjacent fixed roof areas.
Figure 6:
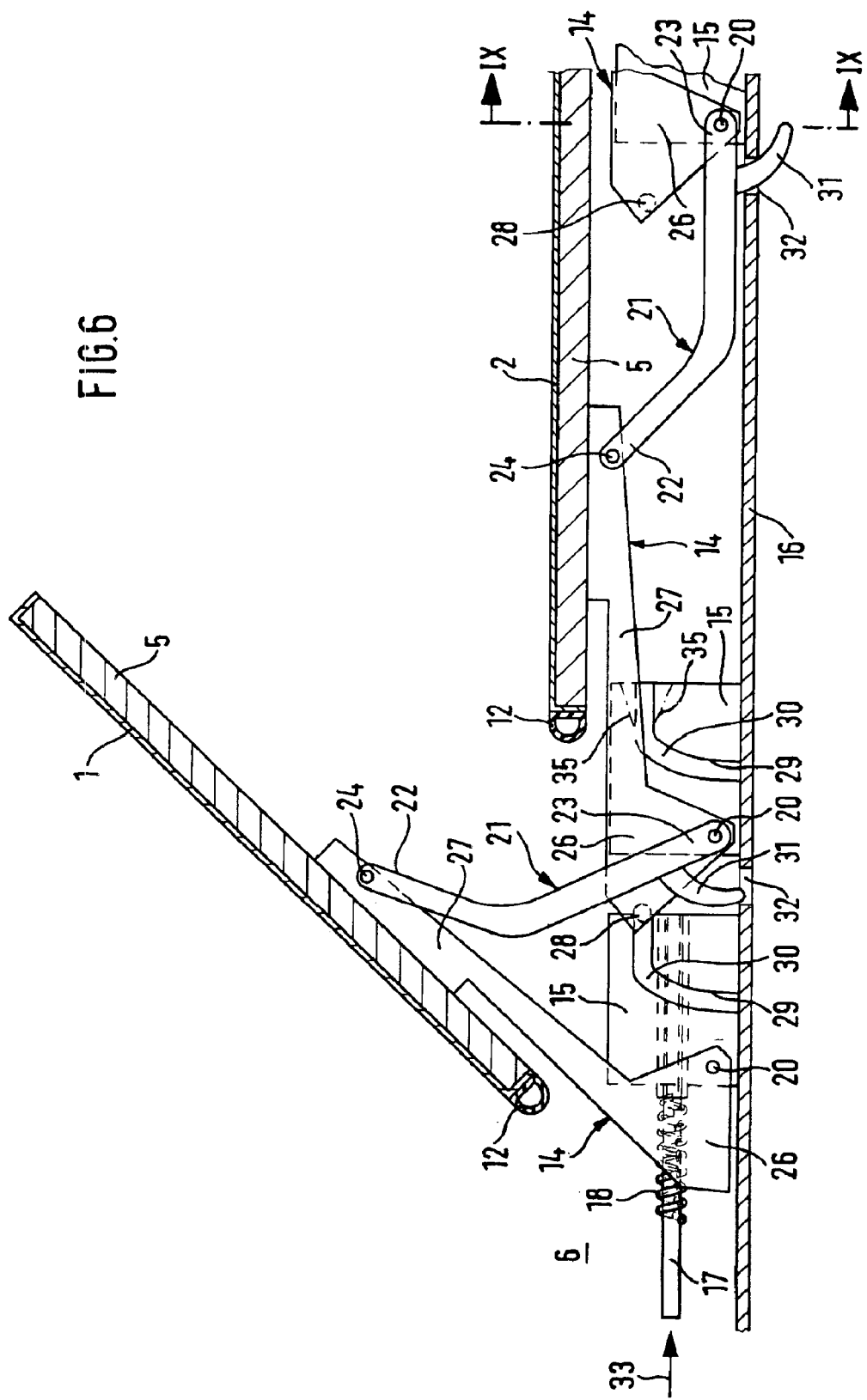
FIG. 6 is a detail enlarged from FIG. 5 and broken away, with the front louver tilted up and the following louvers closed.
Figure 7:
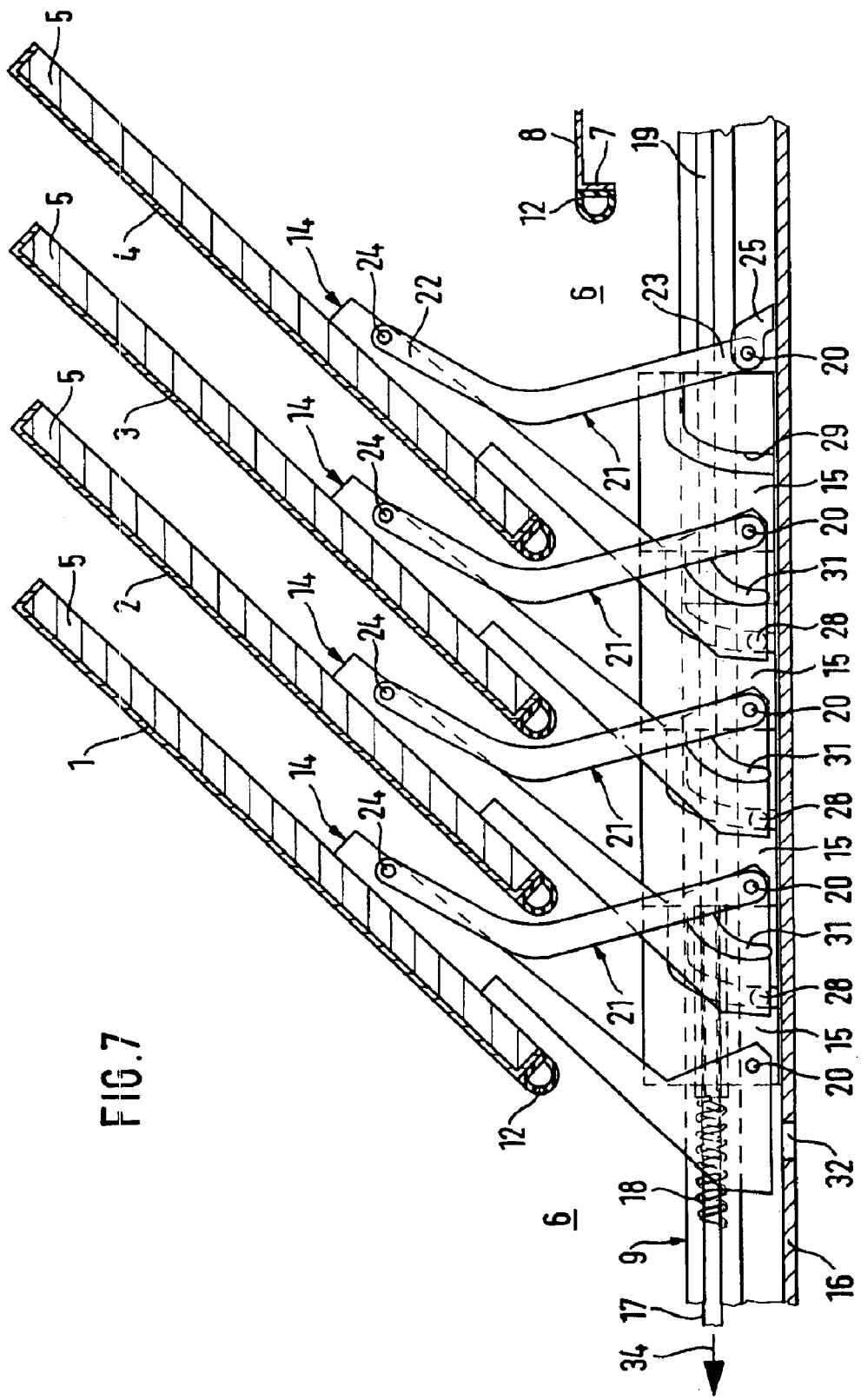
FIG. 7 is a cross-section through the vehicle roof with all louvers tiled up moved as far back as possible, corresponding to the cut line VII—VII in FIG. 3.
Figure 8:
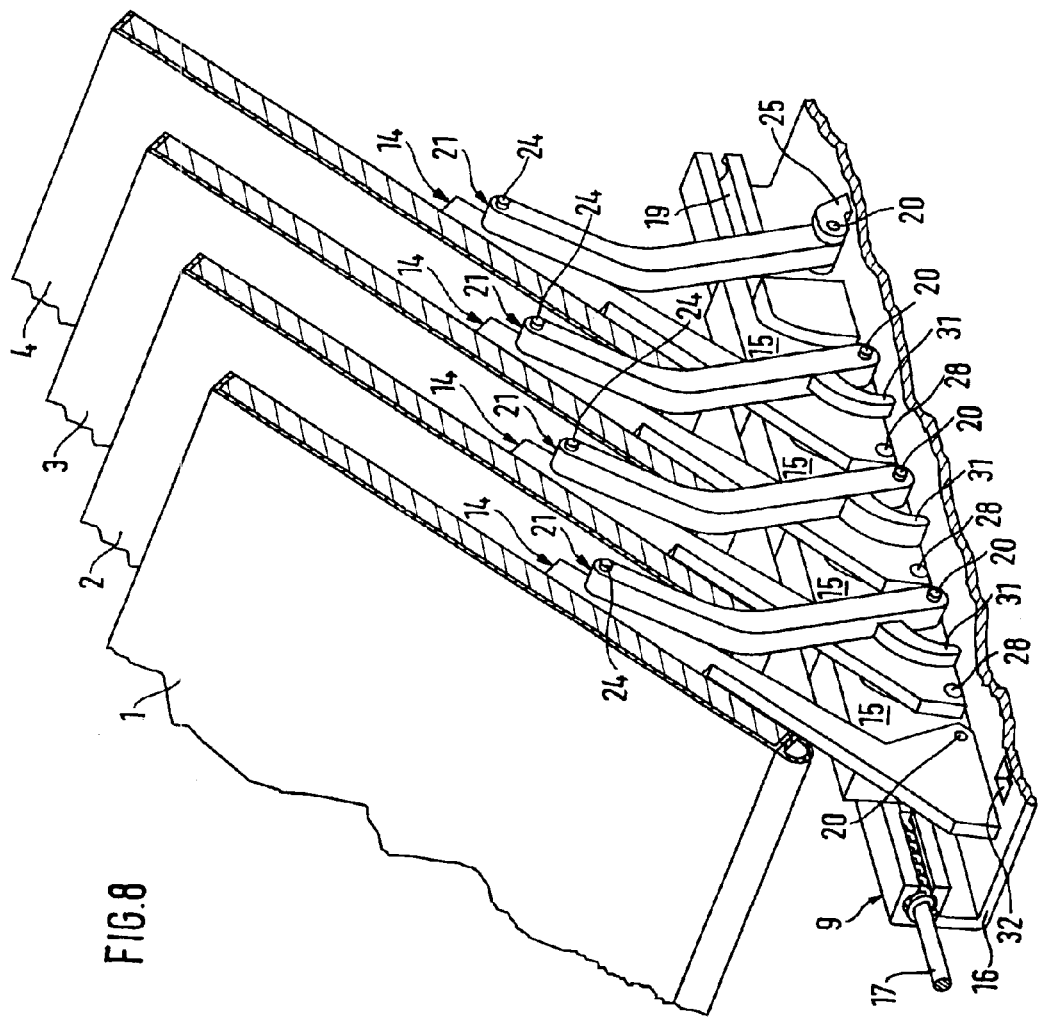
FIG. 8 shows a vehicle roof according to claim 7, but in broken away perspective view.

The interlinking arrangement is such that the link points 20 on two adjacent guide blocks 15, together with the link point 24 of the associated hinge rod 21, form a hinge triangle as shown for example in FIG. 6 and 7. Due to the considerable distances between the three link points 20, 20, 24 of a hinge triangle, the tilted up louvers even in the drive position have a very safe vibration-free state. In the example embodiment, four hinge triangles are provided corresponding to the number of louvers 1 to 4. The link point 20 for the second end 23 of the rear hinge 21 is arranged on a bearing block 25 attached to the guide rail 16 instead of a guide block, as shown in FIGS. 4, 5 and 7. The bearing block 25 can be attached stationary to the guide rail 16 or can be moveable, starting from the closed position shown in FIG. 4, to achieve a ventilation position of the rear louver 4.

The hinge triangles formed from link points 20, 20, 24 are construed so that the link point 24 of the first end 22 of the hinge rod 21, even with the maximum spacing of the adjacent guide blocks 15 or bearing block 25, in the closed position of the two associated adjacent louvers, lie above the horizontal plane in which the link points 20 are located.

The example louver carriers 14 are each angular with two legs and have a shorter leg 26 and a longer leg 27. The shorter leg 26 is linked in each case to the link point 20 of the associated guide block 15. The associated louver is attached to the longer leg 27. The first end 22 of the associated hinge rod 21 is linked via link point 24 to the longer leg 27.

The hinge rods 21 also have a two-legged angular shape, the legs of each enclose an obtuse angle as shown for example in FIG. 6. The obtuse angle apex faces the louver carrier 14 to which the hinge rod 21 is linked. As shown in FIG. 7, this design of the hinge rods 21 allows a tight grouping of the tilted up louvers 1 to 4 without the front edges of the louvers 1 to 4 hitting the hinge rods 21. In the closed position shown completely in FIG. 4 and partially in FIG. 5, the leg of the hinge rod 21 with the second end 23 is aligned approximately parallel to the closed louvers.

Arranged on each louver carrier 14 (with the possible exception of the front louver carrier) is a stop 28 and on each guide block 15 (with the possible exception of the rear guide block) a stop surface 29. The stops 28, in relation to the closed position (FIG. 4), are each arranged at the front end of the louver carrier 14 spaced from the link point 20 to the louver carrier 14.

The stop surfaces 29 have approximately the shape of an arc of a circle, the circle center point of which coincides approximately with the link point 20 of the directly adjacent louver carrier 14 as shown in FIG. 7. This configuration provides a relative position in which the adjacent guide blocks 15 have their minimum spacing when louvers 1 to 4 are fully tilted up. The length or height of the stop surfaces 29 is dimensioned such that the stop surfaces 29 begin at the top approximately at the engagement point of the associated stop 28 in its position to closure (FIG. 4) of the associated louver carrier 14, and end at the bottom of the foot of the guide block 15.

As shown from FIG. 4 to 7, in the example embodiment the stop surfaces 29 are each a part or wall part of a slot 30 formed in the guide blocks 15, in which slot the allocated stop 28 can be moved when adjacent guide blocks 15 move together or apart. To facilitate entry of the allocated stop 28, the slot 30 can be fitted at its outer end at the bottom but also at the top with an inclined surface 35, as shown in dotted lines in FIG. 6 for the example of the guide block 15 for louver 2.

The stops 28 and stop surfaces 29 are allocated to each other so that adjacent stop/stop surface pairs cooperate in each case. This cooperation is such that the guide blocks 15 slide on the guide rail 16 interlinked via the stop/stop surface pairs undertension on the front guide block 15 with the louvers titled up (FIG. 7), and starting at the rear guide block 15 with the tilted-up louver the interlinking of the stop/stop surface pairs is released as soon as the rear louver in each case has reached its closed position.

The hinge rods 21 (with the possible exception of the rear hinge rod) include locking projections 31, which in the closed positions of louvers 1 to 4 each engage with a locking element 32 attached to the guide rail 16. Under pressure on the front guide block 15 first, only this guide block 15 can be moved, its louver 1 tilting up, until the first locking projection 31 is released from its locking element. As the pressure is maintained on the front guide block 15, the next guide block 15 can be moved, its louver 2 tilting up, until the second locking projection 31 has been released from its locking element 32. This process is repeated, as the pressure is maintained, from louver to louver until, if desired, all louvers are tilted up into the open position.

As is shown most clearly in FIGS. 6 and 7, the locking projection 31 on the hinge rods 21 each have approximately the shape of a circle section, the circle center point of which coincides approximately with the link point 20 of the corresponding hinge rod 21 at the associated guide block 15.

The locking elements 32 for the locking projections 31 can be formed as simple recesses in the base wall of the guide rails 16 as shown in FIGS. 4 to 8. The mutual spacing of these recesses corresponds to the spacing between the locking projections 31 in the closed position of louvers 1 to 4.

To explain the movement procedures on opening and closing the louvers 1 to 4, for the opening process reference is first made to FIGS. 4 to 6. Starting from the fully closed position of louvers 1 to 4 according to FIG. 4, moving in the direction of arrow 33 (FIGS. 5 and 6), a pressure s applied to the front guide block 15. First only the front guide block 15 is moved back while the three other guide blocks, due to the engagement of the associated locking projections 31 and locking elements 32, remain in their set positions. Triggered by the movement of the front guide block 15 various procedures take place simultaneously. The front louver carrier 14 rests on the link point 20 of the still firmly held first guide block 15 through the front link point 24 of the front hinge rod 21. The front link point 24 moves up, the front louver carrier 14 tilts up anticlockwise (in relation to the drawing views) about its link point 20 and thus also tilts up louver 1. The front hinge rod 21 tilts clockwise about its link point 20. The locking projection 31 of the front hinge rod 21 moves out of the recess forming its locking element 32 and the front or first guide block 15 approaches the still fixed second guide block 15.

The pressure on the front guide block 15 can be interrupted in any tilt position of the first louver 1 if a front ventilation gap is desired for the first louver 1 tilted up in the manner of the spoiler. FIG. 6 shows the relative position of the components before the front guide block 15 makes contact with the second (i.e., adjacent) guide block.

The locking projection 31 moves almost completely out of its locking element 32 and the stop 28 of the louver carrier 14 of the second louver beings to enter the slot 30. In FIG. 5 the front guide block 15 lies against the second guide block 15. The louver 1 is tilted up to a maximum. The first locking projection 31 has emerged completely from its locking element 32 and the stop 28 has moved through the horizontal section of the slot 30 and is now at the upper end of the stop surface 29.

If now the pressure on the front guide block 15 is maintained, the front guide block 15 and the second guide block 15 are now moved together so that the movement procedure described in relation to louver 1 is repeated on the tilting of louver 2. The stop 28 at the louver carrier 14 of louver 2 tilts about the associated link point 20 and is moved down the associated stop surface 29 until it assumes the position shown in FIG. 7. Under continued pressure on the front guide block 15, all louvers 1 to 4 in succession assume the position shown in FIGS. 7 and 8 until the vehicle roof is fully opened and the louvers 1 to 4 lie closely next to each other. The rear guide block 15 lies limiting the travel on the bearing block 25. The procedure for the opening movement can however be interrupted in any intermediate position, for example in the position in which the front two louvers 1 and 2 are fully tilted up and the rear two louvers 3 and 4 are still completely closed. In this way differently sized areas of the roof opening can be exposed.

If the fully opened louver roof is to be closed, via the control cable 17, a tension is applied to the front guide block 15 in the direction of arrow 34 in FIG. 7. Due to the three stop/stop surface pairs 28/29 in engagement, all four guide blocks 15 are coupled together and follow the direction of arrow 15. As, however, the rear hinge rod 21 is linked to the stationary bearing block 25, the rear louver carrier 14 and hence the rear louver 4 due to the linking of the rear hinge rod 21 on the rear louver carrier 14 immediately begin the tilt down movement about the penultimate link point 20 as the rotation point. Thus, the stop 28 on the rear louver center 14 moves upwards to its stop surface 29.

The tilting down movement of the last louver 4 is completed when it has reached its closed position. The rear stop 28 is now released from its associated stop surface 29 so that under continued tension, the penultimate guide block 15 is removed from the rear guide block stopped in its limit position. Here the penultimate hinge rod 21 and the penultimate louver carrier 14 with its louver 3 now swivel, where towards the end of this movement sequence the locking projection 31 of the penultimate hinge rod 21 enters the associated locking element 32 on the guide rail 16. If the tension is continued until complete closure of the roof opening, the louver closing process continues from rear to front but can however be interrupted at any time in desired intermediate positions. On closure of each further louver, the associated locking projection 31 enters the locking element 32 allocated stationarily thereto on the guide rail 16. The tension transfer between adjacent guide blocks 15 always ends when the stops 28 no longer lie on their associated stop surfaces 29.

The disclosed example louver vehicle roof has several sliding and tilting louvers for optional closure or at least partial exposure of a roof opening. The louvers in the closed position lie next to each other and form a flat assembly. The louvers are interlinked kinematically so that on exposure and closure of the roof opening, one louver after the other is moved. The louvers are interlinked with few simple components (i.e., carriers, hinge rods and link) identical from one louver to the next. The temporary coupling of louver guide blocks during the closing process is provided by stop/stop surface pairs, while during the opening process, progressively and starting from the front, one louver after the next is moved and tilted up, where the louvers not yet in movement are held stationary by locking projections and locking elements.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. An assembly for selectively closing an opening in a vehicle roof, comprising:
   a plurality of louvers that are moveable between open and closed positions;
   a plurality of carriers having at least one end supporting a corresponding one of the louvers;
   a plurality of guide blocks supporting a second end of the carriers such that each carrier can pivot relative to a corresponding one of the guide blocks about a first link location;
   a plurality of link rods, each having a first end pivotally coupled to one of the carriers at a second link location and a second end pivotally coupled to an adjacent one of the guide blocks at a third link location, the first, second and third link locations defining a triangle in all orientations of the louvers;
   at least one guide rail along which the guide blocks are moveable, the guide blocks and carriers having cooperating stop surfaces and stops, respectively, that link the guide blocks together while moving along at least a portion of the guide rail in a manner that the guide blocks and carriers successively disengage as the guide blocks are moved in a direction to close the louvers; and
   locking projections that are operative to maintain an associated guide block in a fixed position relative to the guide rail, the locking projections successively releasing the associated guide blocks from the fixed position as the guide blocks are moved in a direction, to open the louvers.

2. The assembly of claim 1, wherein the first and third link locations are generally coplanar and the second link location is always above the first and third link locations.

3. The assembly of claim 1, wherein the first and third link locations are at the same location.

4. The assembly of claim 1, wherein the carriers each have a lower portion associated with the corresponding one of the guide blocks and an upper portion secured to the corresponding one of the louvers and wherein the first link location is near a first edge of the lower portion of each carrier.

5. The assembly of claim 1, wherein the carriers each include a longer leg and a shorter leg at an oblique angle relative to the longer leg, each shorter leg is linked to the corresponding one of the guide blocks at the first link location and the longer leg is secured to the corresponding one of the louvers.

6. The assembly of claim 1, wherein each link rod includes a first leg linked to a corresponding carrier and a second leg that is generally parallel to a corresponding louver in the closed position, the first and second legs being arranged at an oblique angle relative to each other.

7. The assembly of claim 1, wherein each stop is near one edge of the carrier and spaced from the first link location.

8. The assembly of claim 1, wherein the stop surfaces each have a generally arcuate shape with a radius center point coincident with the first link location of an adjacent guide block when the adjacent guide blocks are in a closest position relative to each other and corresponding ones of the louvers are in the open position.

9. The assembly of claim 1, wherein the stop surfaces comprise slots and the cooperating stops move within the slots as corresponding guide blocks move relative to one another.

10. The assembly of claim 9, wherein each slot has a nominal dimension along a length of the slot and an increased dimension near an inlet to the slot and at least one inclined surface near the inlet.

11. The assembly of claim 1, wherein the locking projections are supported on the link rods and have a generally arcuate shape with a radius center point that coincides approximately with the third link location of the associated guide block.

12. The assembly of claim 1, wherein one of the locking projections is supported on each one of the link rods.

13. The assembly of claim 1, wherein the guide rail includes a plurality of receivers that receive the locking projections when corresponding ones of the louvers are in a closed position.

14. The assembly of claim 1, including a bearing block supported by the guide rail near a rearmost louver that has an associated carrier and an associated link rod and wherein the third link location of the associated link rod is on the bearing block.

15. The assembly of claim 14, wherein the bearing block is selectively moveable relative to guide rail for moving the rearmost louver into an open position.

16. The assembly of claim 1, wherein the stop surfaces, the stops and the locking projections cooperate such that one of the louvers moves from a closed position into a fully open position before the guide block associated with an adjacent louver is released from the fixed position and the adjacent louver remains in a closed position until the associated guide block is released.

17. The assembly of claim 16, wherein the louvers open in a sequential manner responsive to an opening force applied in an opening direction to at least a first one of the guide blocks.

18. The assembly of claim 16, wherein the louvers close in an opposites sequential order responsive to a closing force applied in a closing direction that is opposite the opening direction.

19. A vehicle roof assembly, comprising:
- a roof surface having an opening;
- a plurality of louvers that are moveable between open and closed positions for selectively and at least partially closing the opening;
- a plurality of carriers having at least one end supporting a corresponding one of the louvers;
- a plurality of guide blocks supporting a second end of the carriers such that each carrier can pivot relative to a corresponding one of the guide blocks about a first link location;
- a plurality of link rods, each having a first end pivotally coupled to one of the carriers at a second link location and a second end pivotally coupled to an adjacent one of the guide blocks at a third link location, the first, second and third link locations defining a triangle in all orientations of the louvers;
- at least one guide rail along which the guide blocks are moveable, the guide rail being supported relative to the roof surface in the vicinity of the opening, the guide blocks and carriers having cooperating stop surfaces and stops, respectively, that keep the guide blocks moving together along the guide rail in a manner that the guide blocks and carriers successively disengage as the guide blocks are moved in a direction to close the louvers; and
- locking projections that are operative to maintain an associated guide block in a fixed position relative to the guide rail, the locking projections successively releasing the associated guide blocks from the fixed position as the guide blocks are moved in a direction to open the louvers.

20. The assembly of claim 17, wherein the stop surfaces, the stops and the locking projections cooperate such that one of the louvers moves from a closed position into a fully open position before the guide block associated with an adjacent louver is released from the fixed position and the adjacent louver remains in a closed position until the associated guide block is released.

* * * * *